United States Patent [19]

Rodgers, Jr.

[11] Patent Number: 5,540,637
[45] Date of Patent: Jul. 30, 1996

[54] STATIONARY EXERCISE APPARATUS HAVING A PREFERRED FOOT PLATFORM ORIENTATION

[75] Inventor: Robert E. Rodgers, Jr., Houston, Tex.

[73] Assignee: CCS, LLC, Denver, Colo.

[21] Appl. No.: 503,301

[22] Filed: Jul. 17, 1995

Related U.S. Application Data

[63] Continuation-in-part of Ser. No. 377,846, Jan. 25, 1995.

[51] Int. Cl.$^6$ .............................. A63B 69/16; A63B 22/04
[52] U.S. Cl. ............................ 482/52; 482/51; 482/70; 482/57
[58] Field of Search ......................... 482/51, 52, 53, 482/54, 57, 70, 71, 74, 79, 80, 92, 62

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |

FOREIGN PATENT DOCUMENTS 2919494 5/1979 Germany .

Primary Examiner—Stephen R. Crow
Attorney, Agent, or Firm—Marc L. Delflache; Pravel, Hewitt, Kimball & Krieger

[57] ABSTRACT

A stationary exercising apparatus which promotes cardiovascular exercise yet minimizes impact to critical joints. A base frame supports a pair of reciprocating members which are displaced in a horizontal direction parallel with the floor at one end yet reciprocate in a circular motion at the other end through a coupling system attached to the frame. Structure is included which permits each foot of the user to move in a generally elliptical path during the climbing exercise. This provides for more movement of the foot platform in a substantially elliptical path while each foot platform, or a predetermined reference plane for each platform, remains substantially parallel with the floor through at least a portion of the lower half of the elliptical path proximate the forward end of the elliptical path. The apparatus may include linkage to facilitate a corresponding upper body exercise involving movement of the arm in which case each hand of the user is displaced along an arc or a substantially elliptical path, again promoting a more natural movement of the ankle, knee, elbow and shoulder joints and permitting a cardiovascular workout.

30 Claims, 3 Drawing Sheets

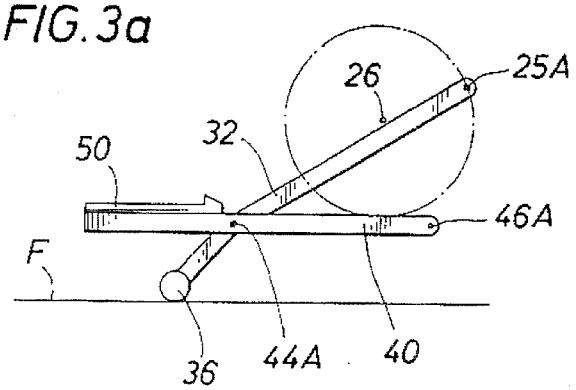
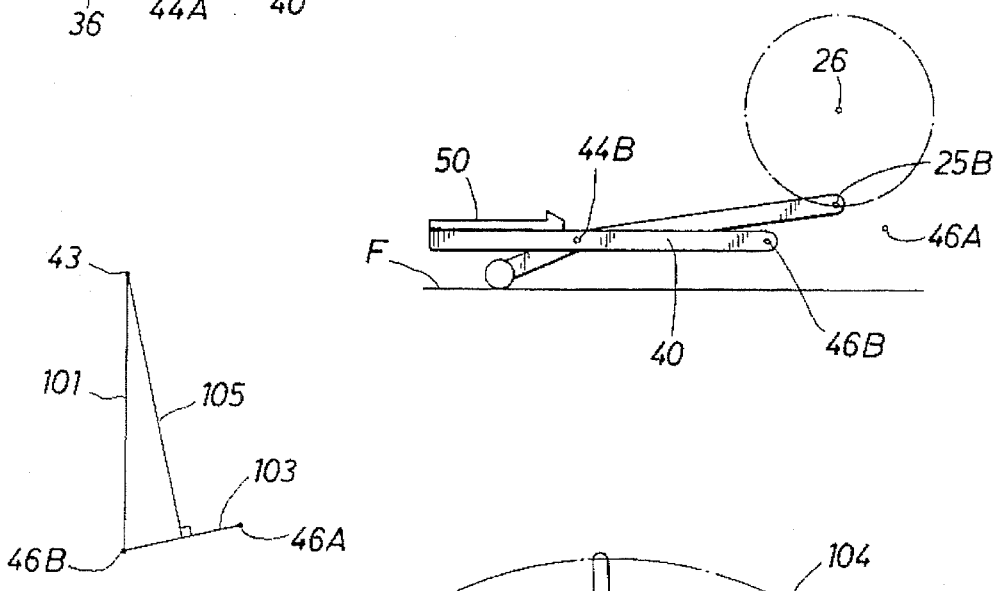
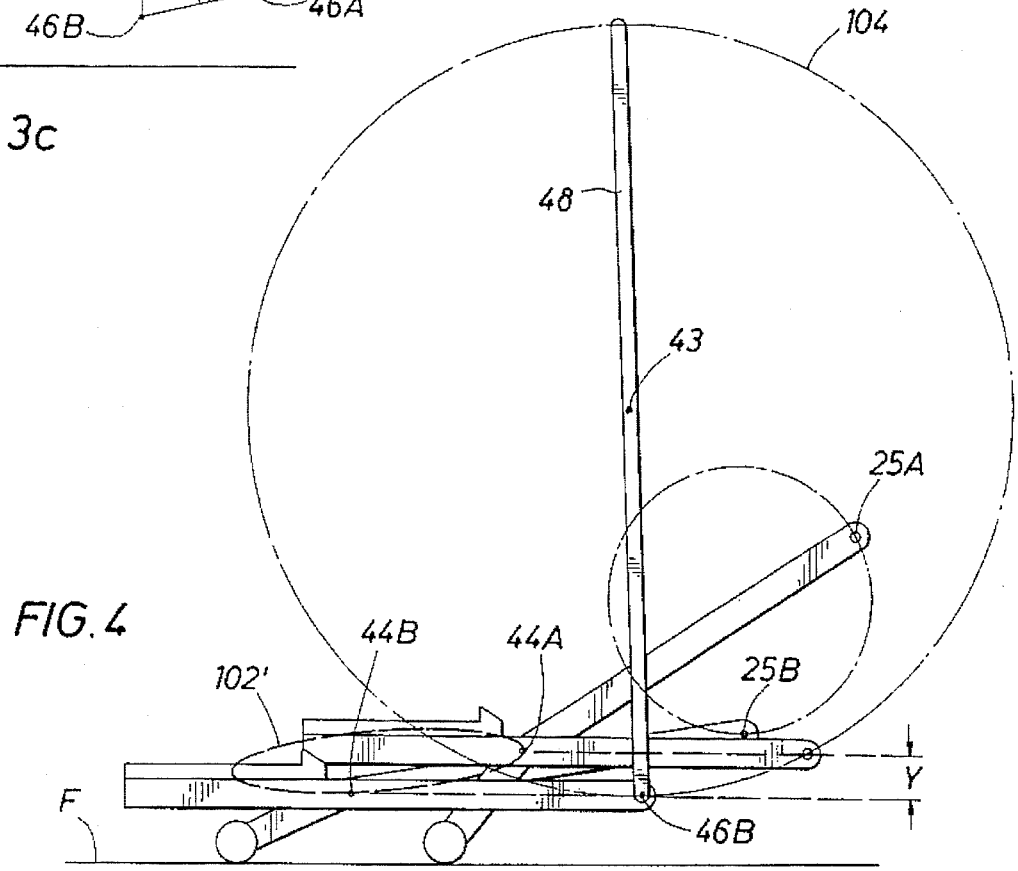

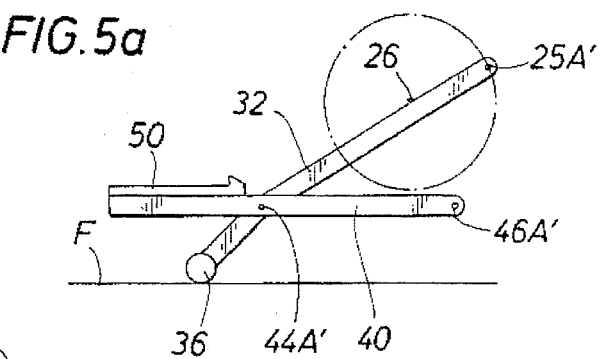
FIG.5a
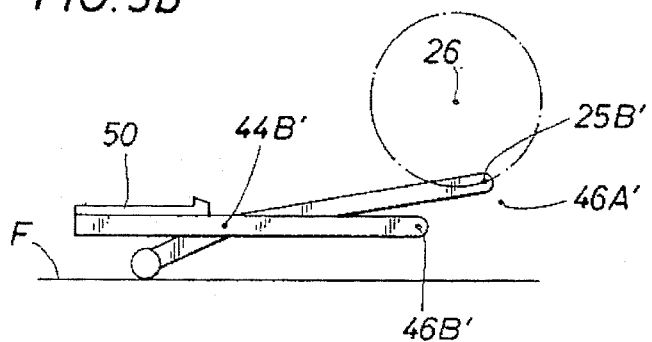
FIG.5b
FIG.5c
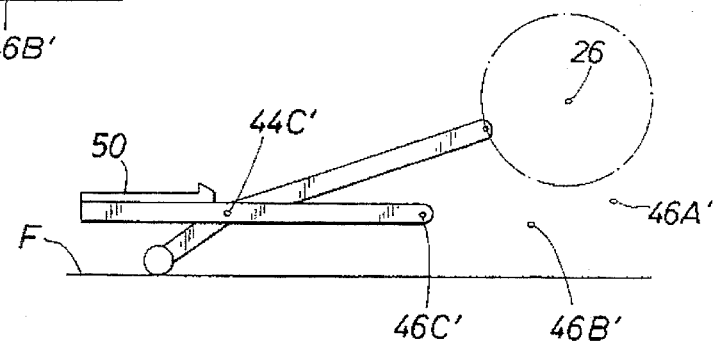
FIG.5d
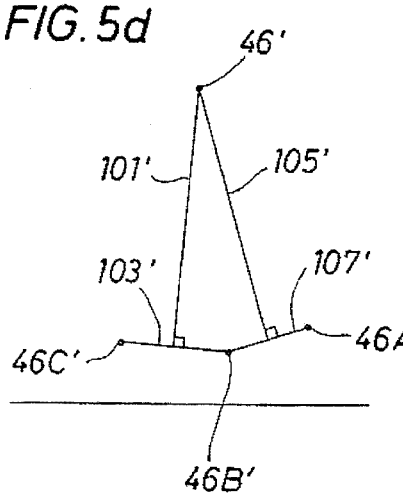
FIG.6
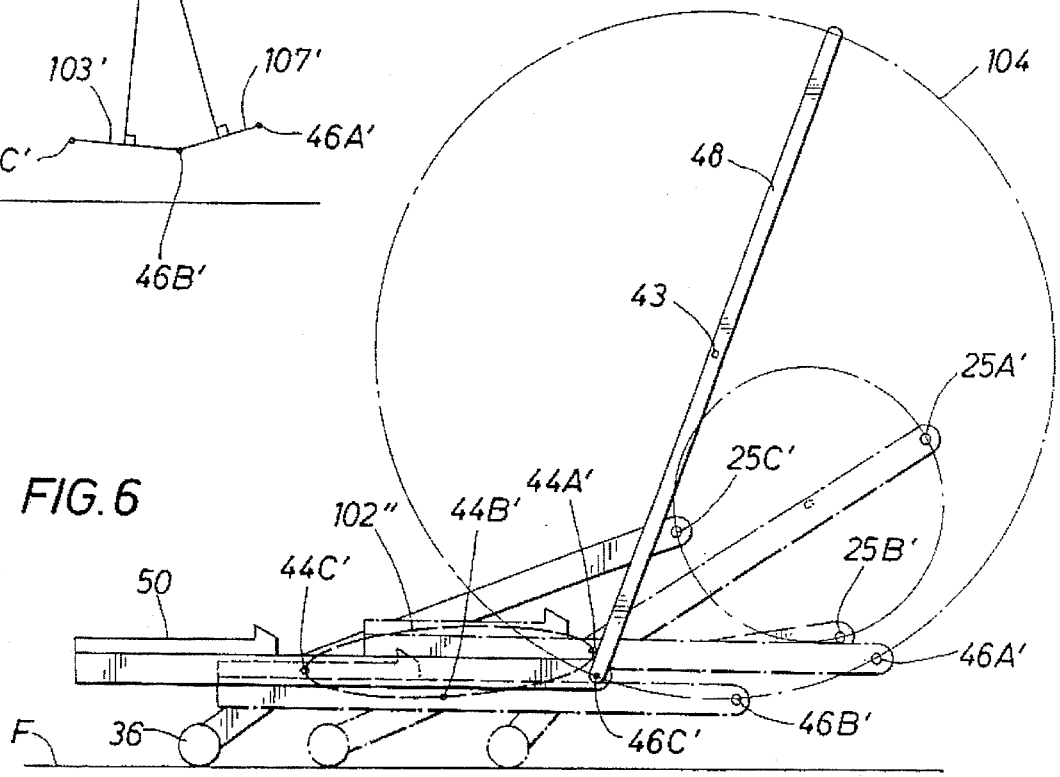

STATIONARY EXERCISE APPARATUS HAVING A PREFERRED FOOT PLATFORM ORIENTATION

SPECIFICATION

RELATED APPLICATIONS

This patent application is a continuation-in-part of U.S. patent application Ser. No. 08/377,846, filed Jan. 25, 1995 entitled Stationary Exercise Apparatus.

BACKGROUND OF THE INVENTION

1. Field of the Invention

The present invention relates to an improved stationary exercising apparatus. More particular, the invention relates to an improved exercising apparatus which enables the user to move his feet in an elliptical path while foot platforms remain substantially parallel with a reference plane through at least a portion of the lower half of the elliptical path.

2. Description of the Prior Art

Stair climbing is a popular form of exercise for the cardiovascular system. However, it can over prolonged use overstress the knees. Walking is also a popular form of exercise but it does not load the cardiovascular system to the extent stair climbing does. Therefore, the need exists for an improved stationary exercising device which will load the cardiovascular system as stair climbing does but does not overload or unduly stress the knees and other joints. Prior art stair climbing devices have two common draw backs. First, they require excessive lifting of the knees or an exaggerated vertical movement of the lower legs. See, for example, U.S. Pat. Nos. 3,316,898; 4,949,993; 4,989,857; and 5,135,477. Alternatively, the devices which do tend to promote a more natural movement of the knees and ankles are difficult to ascend and descend because of the configuration of the devices. See, for example, U.S. Pat. No. 5,242,343. Additionally, while certain prior art devices have attempted to imitate a more natural movement of the knees or ankles, they have failed to provide an accurate simulation. See, for example, U.S. Pat. Nos. 5,242,343 and 5,383,829.

In addition, the need exists for a more rhythmic movement of the hand motions in combination with a stair climbing exercise to accelerate a cardiovascular workout and exercise the upper body muscle groups without unduly overstressing the elbows and shoulders. Hence, the need exists for an improved stationary exercise device which can combine the movements of the feet and hands in a more natural and rhythmic motion.

SUMMARY OF THE INVENTION

Briefly, the invention relates to an improved stationary exercising device. A frame is provided which includes a base portion adapted to be supported by the floor, a mid portion and a top portion. A coupling member is attached to the frame which includes a pulley defining a pivot axis. Two reciprocating members are positioned in spaced relationship to the base portion of the frame. One end of each reciprocating member is adapted for linear movement substantially parallel with the floor. That end of each of the reciprocating member being linearly displaced may contact the base portion or it may slide directly on the floor. The other end of each reciprocating member is attached, directly or indirectly, to the pulley of the coupling member. In this manner, rotation of the pulley rotates one end of each reciprocating member in a circular motion while the other end of each reciprocating member moves in a linear manner.

Means are also included for orienting the bottom of each foot of the user of the apparatus. During operation, a foot platform which supports each foot follows a substantially elliptical path while a reference plane for each foot platform, such as the foot contact surface, remains substantially parallel to the floor as that foot platform advances initially rearwardly from the forward end of the elliptical path along at least a portion of the lower half of the elliptical path. This serves to provide preferred anatomical movement of the ankles and feet. Additionally, the dimensions of the orienting means may be selected so that the reference plane for each foot platform remains substantially parallel with the floor as that foot platform advances along at least a portion the lower half of the substantially elliptical path.

Such means for orienting the bottom of the foot may include a linkage assembly for each reciprocating member. Each such linkage assembly comprises at least one link which is pivotally connected proximal one end between the two ends of the reciprocating member, closest to the end that is being displaced along the floor. A foot platform is attached to the link which is pivotally connected to the reciprocating member proximate that end of the link connected to the reciprocating member. This additional linkage is restrained at its other end within the base portion of the frame permitting the second end of the link only to move substantially parallel with the floor or base as is the case for the first end of each reciprocating member. The reference plane for each foot platform may be the top contact surface of the foot platform which the foot of user engages to operate the apparatus, or it may be based on a fixed reference to another portion of the foot platform or the link.

Each linkage assembly includes a second link which is pivotally connected to the second end of the first link. The second link is then pivotally restrained to the top portion of the frame proximate its other end. This second link also provides for hand movement.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

FIGS. 3(a)–3(c) are sequential views of the geometric considerations of the present invention to provide for a two point control elliptical path.

FIG. 4 is an elevation view of the present invention showing the two point control elliptical path of the present invention.

FIGS. 5(a)–5(d) are sequential views of the geometric considerations of the present invention to provide for a three point control elliptical path.

FIG. 6 is an elevation view of the present invention showing the three point control elliptical path of the present invention.

DETAILED DESCRIPTION OF PRESENT INVENTION

Figure 1:
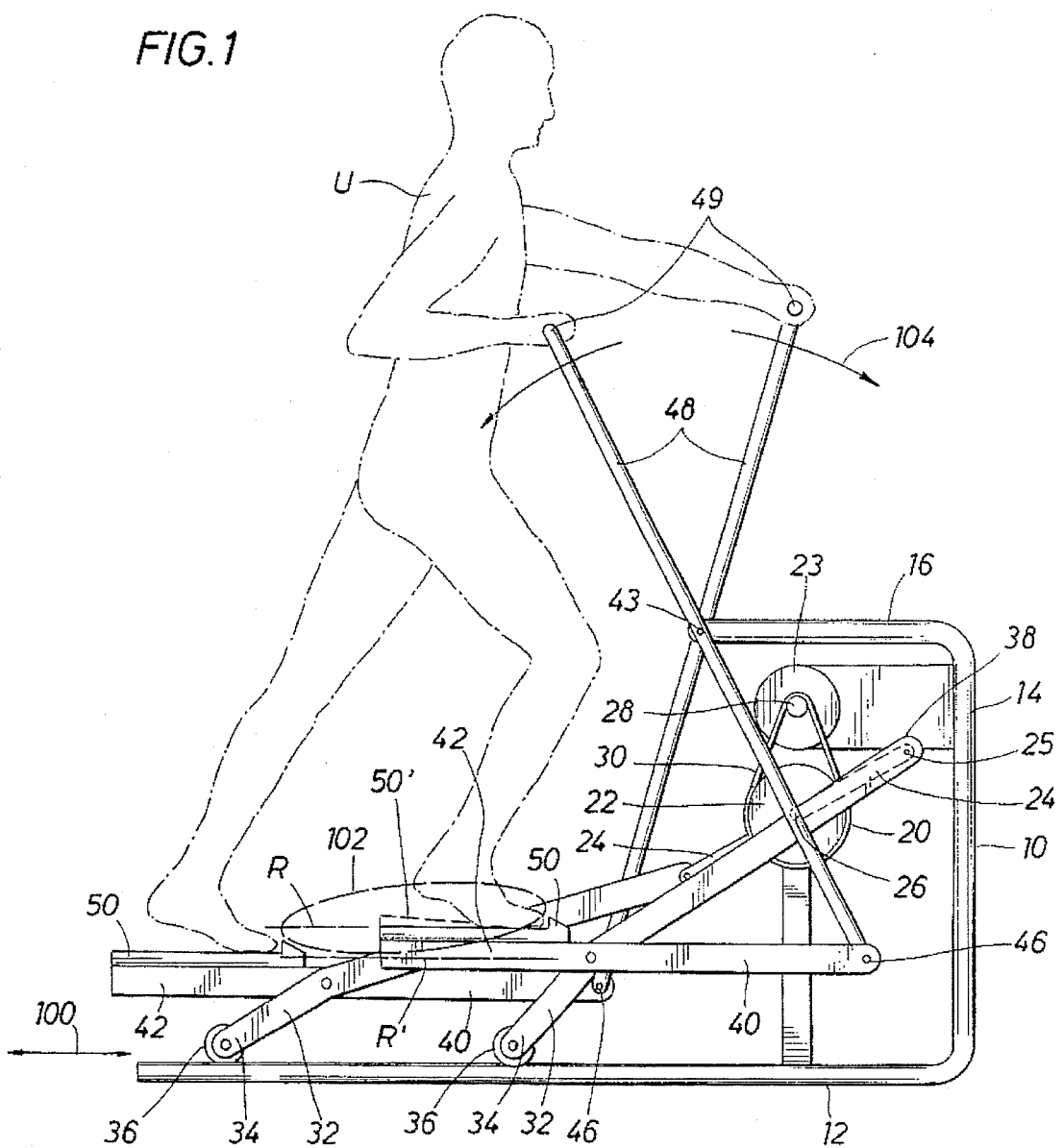
FIG. 1 is an elevation view of the preferred embodiment of the present invention.
Figure 2:
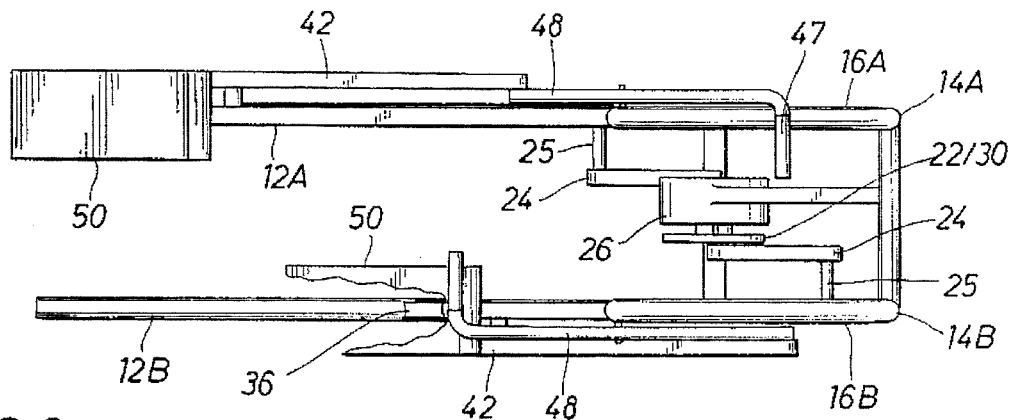
FIG. 2 is a plan view of the preferred embodiment of the present invention.

Referring to FIGS. 1 and 2, a frame 10 is shown comprising a base portion 12, a mid portion 14, and a top portion 16. Referring briefly to FIG. 2, the frame 10 comprises two bottom portions 12a and 12b, two mid portions 14a and 14b, and two top portions 16a and 16b. In essence, the frame is comprised of two separate bents "a" and "b". Obviously, variations can be made to frame 10 as disclosed without departing from the spirit of the invention.

A coupling system 20 is fixed relative to the frame and comprises a pulley 22, crank members 24, resistant brake 23, sheave 28 arid belt 30. Two reciprocating members 32 are positioned in the lower proximity of frame 10. Each reciprocating member 32 has one end 34 which is adapted to move laterally in a linear direction as shown in FIG. 1. A roller 36 is mounted at each end 34 of reciprocating member 32 and is adapted, as shown in FIG. 1, to ride on base portion 12 of frame 10. Alternatively, roller 36 may directly engage the floor, if desirable. The other end 38 of each reciprocating member 32 is pivotally connected to one end of a crank 24. The pivotal connection at end 38 may be through a pivotal connection member 25 (see FIG. 2) which extends between the other ends 38 of reciprocating members 32 and cranks 24. The other end of crank 24 is attached to pulley 22 at the pivot axis 26 of the coupling system 20. The pivot axis 26 is the axis about which pulley 22 rotates.

The present invention also includes two foot members, or contact members, 40. Each foot member 40 is pivotally attached proximate a first end 42 through a pinned connection 44 to the reciprocating arm 32. A foot platform 50 is attached to the top surface of each foot member 40 at its first end 42. A reference plane "R" is shown as the top of each foot member. However, a reference plane may be defined within any fixed plane of each foot member 40 or foot platform 50 such as is shown, for example, by R'.

Each foot platform 50 has a top surface which the foot of the user contacts in the operation of the apparatus. Each foot member 40 is pivotally attached at its other end 46 to an arm member 48. Each arm member 48 is also pivotally attached proximal its other end to the top portion 16 of frame 10. A handle portion 47 (see FIG. 2) is included at the top end 49 of each hand member 48.

Referring to FIG. 2, it can be easily seen that the frame 10 comprises dual base portions 12A/12B, mid portions 14A/14B and top portions 16A/16B. Furthermore, it can be seen that reciprocating members 32, foot members 40, foot platforms 50 and arm members 48 provide identical dual systems; each system resting on a base portion 12A or 12B of the frame and each arranged to accommodate one foot and one arm of the user.

In the operation of the preferred embodiment the user "U" can ascend the present invention from the back or the sides which facilitate its use. In some prior art disclosures ascending and descending is difficult and cumbersome due to the location of the pulleys and other structures. See, for example, U.S. Pat. No. 5,242,343. However, in the case of the present invention it is easy to ascend and descend the device as there is a minimal amount of interference in the structure during exercise activity.

During operation the user places one foot on each foot platform 50 and begins a climbing motion which results in the displacement of first ends 34 of each reciprocating member 32 in the direction of arrow 100. Similarly, a circulating motion occurs at the second end 38 of each reciprocating member 32 about pivot axis 26. However at points between opposite ends 34 and 38 of each reciprocating member 32, the motion gradually changes from a circular motion (at ends 38) to a linear motion at ends 34. This geometric transition occurs in the form of an approximate elliptical path 102. It is not a perfect elliptical shape, and it tends to be slightly more egg-shaped. However, it provides a more natural and rhythmic body movement. Additionally, during operation, the upper end 49 of each arm member 48 moves in an arc as shown by arrow 104. Resistant brake 23 of coupling system 20 operates in a manner well known to those skilled in the art. Resistant brake 23 serves to increase or decrease the load on the pulley through the sheave 28/belt 30 arrangement. Thus, resistant brake 23 serves to increase or decrease the extent of the cardiovascular workout. Such permits hand/arm/shoulder movements for exercising the upper body muscle groups while continuing the cardiovascular exercise.

In addition to the revolution of the foot platform in a preferred substantially elliptical path as noted above, the present invention provides that a reference plane will remain parallel with the floor throughout at least a portion of the lower half of the elliptical path. If the reference plane is the top contact surface of the foot platform 50 which the user's foot engages, then the top surface of each foot platform will remain substantially parallel with the floor as that foot platform advances initially rearwardly proximate the forward end of the elliptical path along the lower half of the ellipse. It may be desirable to select a reference plane other than the top surface of the foot platform, such as R' in FIG. 1, if it is desirable to orient the top of the foot platform at a slight angle relative to the floor while the reference plane remains substantially parallel with the floor as the foot platform advances initially rearwardly through at least a portion of the lower half of the elliptical path from the forward end of the elliptical path. The orientation of the top of the foot platform at a slight angle as noted above is shown by phantom line 50' in FIG. 1.

To further understand the operation of the present invention, it may be helpful to describe the creation of the preferred elliptical path. The term "two point control" shall be used to describe the creation of the preferred elliptical path defined by two points. The two point control geometric configuration will provide for the orientation of a reference plane (which in this example shall be the top surface of the foot platform 50) substantially parallel for that portion of the ellipse between the two points which define the path, which is a portion of the forward end of lower half of the elliptical path. As set forth herein, a geometric configuration is also provided for a "three point control" to define the elliptical path. The three point control configuration defines the lower half of an elliptical path wherein a reference plane (which again in this example shall be the top surface of the foot platform) remains substantially parallel with the floor between the three points, or the lower half of the elliptical path.

Referring now to FIGS. 3(a)–3(c) and FIG. 4, the two point control system shall be described. With respect to FIGS. 3(a)–3(c) and FIG. 3(a) in particular, a reciprocating member 32 and a foot member 40 are shown in the most forward position of what will be substantially elliptical path 102 of FIG. 1. This most forward position is defined by point 44A. In this position, second end of member 32 is point 25A which is on the circle about pivot axis 26.

The configuration of FIG. 3(a) is selected so that point 44A will be the most forward position on the elliptical path. In this configuration, foot member 40 is then oriented substantially parallel with floor F. This ensures that the top surface of foot platform 50 is also oriented substantially parallel with floor F. If a reference plane other than the top surface of foot platform 50 is selected, then the reference plane is oriented substantially parallel with the floor. Thus, a point 46A is defined in space at the second end of foot member 40. Concurrently, the second end of member 32, which is revolving around axis 26, defines a point 25A.

Referring now to FIG. 3(*b*), the second end of member 32 is rotated about axis 26 until foot member 40 is repositioned so that pivot point 44B defines the lowest point of the elliptical path. Since members 32 and 40 are pivotally connected at 44, this defines a point 25B of the circle generated by the second end of member 32 about axis 26 which also coincides with the lowest point of that circle. Once again, member 40 is oriented substantially parallel with floor F so that the top of foot platform 50 is also substantially parallel with floor F. Once again, if a reference plane other than the top surface of foot platform 50 is selected, then that reference plane is oriented substantially parallel with the floor. In this manner, the most forward point (44A) and the lowest point (44B) of the substantially elliptical path are defined.

Referring now to FIG. 3(*c*), points 46A and 46B are plotted which are used to define two points of a larger circle. This larger circle defines the relative location of member 48 with respect to foot member 40 and serves to ensure that while member 48 oscillates, the foot platform will remain substantially parallel with the floor through at least a portion of the forward end of the lower half of elliptical path. A vertical line 101 is projected upwardly from point 46B. Point 46B is selected for the vertical projection since the larger circle, defined by the rotation of arm members 48, is tangential to substantially elliptical path 102 at point 46B. Next, a line 103 is drawn connecting points 46A and 46B. A line 105 is then constructed from the midpoint of line 103 and perpendicular to line 103. The intersection of lines 101 and 105 defines the pivot point 43 for the connection of the arm member 48 to frame 10. Thus, this geometric configuration ensures that points 46A and 46B will move within the circle defined by the radius 101 and that elliptical path 102 has most forward point 44A and lowest point 44B. In this manner, the top surface of foot platform 50 will remain substantially parallel with floor F through at least the distance from points 44A to 44B of the lower half of substantially elliptical path 102 of FIG. 1. The construction of an elliptical path in accordance with the geometrical layout of FIGS. 3(*a*) through 3(*c*) is shown in FIG. 4 and designated as elliptical path 102'. Thus, as the foot platform 50 revolves along elliptical path 102', each foot platform will remain substantially parallel with the floor as it advances initially rearwardly proximate the forward end of the elliptical path along a portion of the lower half of the elliptical path 102'.

Referring now to FIG. 4, it can be seen that the vertical distance between the most forward point 44A of elliptical path 102' and the lowest point 44B of elliptical path 102' defines a distance "Y" which also coincides with the vertical distance between points 46A and 46B along circle 104. Circle 104 also defines the oscillating motion of handles 49 which are gripped by the user and reciprocated during operation.

In this manner, two points are used to define a preferred elliptical path which ensures that the top portion of foot platform 50 will remain substantially parallel through at least a portion of the forward end of the lower half of the ellipse. This provides for preferred anatomical and ergonomical benefits during the exercise motion of the foot, ankle and knee as described herein.

Referring now to FIGS. 5(*a*)–5(*d*) and FIG. 6, the three point control system will be used to describe the creation of a substantially elliptical path 102" which provides that the top of each foot platform 50 will remain substantially parallel with the floor F through substantially the lower half of the substantially elliptical path. As noted above, this example will be given in terms of each reference plane R being the top of a foot platform 50. It may be desirable to use a reference plane for each linkage assembly other than the top of a foot platform. In any event, the application is the same as noted herein.

Referring to FIG. 5(*a*), foot member 40 is first located in the most forward position of what will be elliptical path 102". This defines a point 44A'. In this position, the second end of member 32, which is pivotally connected to member 40, defines a point 25A' on the circle about pivot axis 26. In this most forward position, foot member 40 is once again oriented substantially parallel with floor F to ensure that the reference plane (the top of the foot platform) is oriented substantially parallel to the floor. Once again, if a reference plane other than the top surface of foot platform 50 is selected, then that reference plane is oriented substantially parallel with the floor. This defines a point 46A' at the second end of member 40. As noted earlier, this configuration also ensures that foot platform 50 will be substantially parallel with the floor at the forward portion of substantially elliptical path 102".

Referring to FIG. 5(*b*), reciprocating member 32 is then pivoted about pivot axis 26 to a second point which the designer may select to be proximate the mid axis of the ellipse, but its location is not critical other than orienting it proximate the mid portion of the lower half of the ellipse of what will be elliptical path 102". This defines a point 44B' on elliptical path 102". Once again, arm member 40 is oriented substantially parallel with the floor which defines point 46B' of the second end of member 40, and ensures that the top surface of foot platform 50 (or another previously defined reference plane) remains substantially parallel with the floor F.

Referring to FIG. 5(*c*), the second end of member 32 is then rotated about pivot axis 26 until member 40 is at the most rearward portion of the elliptical path 102", ensuring that member 40 remains substantially parallel with the floor F. This defines a third point 44C' of the elliptical path 102" and also a point 46C' in space for purposes of defining the relationship between arm member 48 and foot member 40.

Referring to FIG. 5(*d*), with points 44A', 44B' and 44C' defined on the lower half of preferred substantially elliptical path 102", points 46A', 46B' and 46C' are defined in space. With points 46A', 46B' and 46C' defined, line 107' is drawn connecting points 46A' and 46B', and line 103' ks drawn connecting points 46B' and 46C'. A line 105' is then drawn perpendicular to line 107' at the midpoint of line 107'. Similarly, a line 101' is drawn perpendicular to line 103' at the midpoint of line 103'. Lines 101' and 105' intersect at point 43', which becomes the hinge point of the arm member 48 to frame 10 as shown in FIG. 1. This configuration will ensure that the pivotal connection of arm member 48 to foot member 40 at point 46 will remain on circle 104" and will maintain foot member 40 in the preferred substantially elliptical path 102" such that the top of foot platform 50 remains substantially parallel with the floor through at least the portion of elliptical path 102" defined between points 44A' and 44C', the lower half of path 102". This configuration also ensures that handles 49 of each arm member 48 reciprocate in an oscillating path defined by arrows 104 of FIG. 1 which coincide with the arc of circle 104 of FIG. 4.

Further, it appears that the preferred location of pivotal connection 44 relative to the length of reciprocating member 32 is generally in that ⅓ portion closest to first end 34 of each reciprocating member 32. It is in this range that the movement of each foot of the user follows a more traditionally shaped elliptical path which is more natural and comfortable for the ankles and knees, minimizing stress on these joints yet permitting continued cardiovascular exercise.

Obviously, modifications and alternations to the preferred embodiment disclosed herein will be apparent to those skilled in the art in view of this disclosure. However, it is intended that all such variations and modifications fall within the spirit and scope of this invention as claimed.

What is claimed is:

1. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means for orienting the bottom of each foot of the user of the apparatus, said orienting means including first and second foot platforms and corresponding first and second predetermined reference planes so that during operation of the apparatus each said foot platform follows a substantially elliptical path having upper and lower halves and forward and rearward ends while said first predetermined reference plane remains substantially parallel with the floor as said first foot platform advances rearwardly proximate said forward end through at least a portion of the lower half of said elliptical path and said second predetermined reference plane remains substantially parallel with the floor as said second foot platform advances rearwardly proximate said forward end through at least a portion of the lower half of said elliptical path.

2. The exercising apparatus according to claim 1 wherein said coupler member attaching means comprises:

a first element attached at one end to said pulley proximate said pivot axis and at its other end to said second end of said first reciprocating member; and a second element attached at one end to said pulley proximate said pivot axis and at its other end to said second end of said second reciprocating member.

3. The exercising apparatus according to claim 1 wherein said frame further comprises a top portion adapted to provide hand support for the user of the apparatus.

4. The exercising apparatus according to claim 1 wherein said orienting means comprises:

first and second linkage assemblies, said first linkage assembly being pivotally connected proximate one end between the first and second ends of said first reciprocating member proximate said first end of said first reciprocating member, and said second linkage assembly being pivotally connected proximate one end between the first and second ends of said second reciprocating member proximate said first end of said second reciprocating member, each linkage assembly being pivotally attached at its other end to said frame distally from said coupling member, said first and second linkage assemblies having a handle portion proximate said pivotal connection to said frame so that the user of said apparatus may grip the handle portions during use of the apparatus enabling a substantially arcuate movement of said handle portions.

5. The exercising apparatus according to claim 1 wherein said orienting means comprises:

a first linkage assembly having a first link and a second link, one end of said first link of said first linkage assembly being pivotally attached proximate said one end between said first and second ends of said first reciprocating member, and said second link of said first linkage assembly being pivotally connected at one end to the other end of said first link and pivotally connected proximate the other end of said second link to said frame;

a second linkage assembly having a first link and a second link, one end of said first link of said second linkage assembly being pivotally attached proximate said one end of said first link of said second linkage assembly between said first and second ends of said second reciprocating member, and said second link of said second linkage assembly being pivotally connected at one end to the other end of said first link of said second linkage assembly and pivotally connected proximate the other end of said second link to said frame;

said second links of said first linkage assembly and said second linkage assembly having a handle portion proximate said other end so that the user of said apparatus may grip the handle portions during use of the apparatus enabling a substantially arcuate movement of said handle portions.

6. The exercising apparatus according to claim 1 wherein said first and second reference planes remain substantially parallel with the floor as said corresponding first and second foot platforms advance rearwardly through substantially the lower half of said elliptical path.

7. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means for orienting the bottom of each foot of the user of the apparatus, said orienting means including first and second foot platforms so that during operation of the apparatus each said foot platform follows a substantially elliptical path having upper and lower halves and forward and rearward ends while each said foot platform remains substantially parallel with the floor as it advances initially rearwardly proximate said forward end along at least a portion of the lower half of said elliptical path.

8. The exercising apparatus according to claim 7 wherein said coupler member attaching means comprises:

a first element attached at one end to said pulley proximate said pivot axis and at its other end to said second end of said first reciprocating member; and a second element attached at one end to said pulley proximate said pivot axis and at its other end to said second end of said second reciprocating member.

9. The exercising apparatus according to claim 7 wherein said frame further comprises a top portion adapted to provide hand support for the user of the apparatus.

10. The exercising apparatus according to claim 7 wherein said orienting means comprises:

first and second linkage assemblies, said first linkage assembly being pivotally connected proximate one end between the first and second ends of said first reciprocating member proximate said first end of said first reciprocating member, and said second linkage assembly being pivotally connected proximate one end between the first and second ends of said second reciprocating member proximate said first end of said second reciprocating member, each linkage assembly being pivotally attached at its other end to said frame distally from said coupling member, said first and second linkage assemblies having a handle portion proximate said pivotal connection to said frame so that the user of said apparatus may grip the handle portions during use of the apparatus enabling a substantially arcuate movement of said handle portions.

11. The exercising apparatus according to claim 7 wherein said orienting means comprises:

a first linkage assembly having a first link and a second link, one end of said first link of said first linkage assembly being pivotally attached proximate said one end between said first and second ends of said first reciprocating member, and said second link of said first linkage assembly being pivotally connected at one end to the other end of said first link and pivotally connected proximate the other end of said second link to said frame;

a second linkage assembly having a first link and a second link, one end of said first link of said second linkage assembly being pivotally attached proximate said one end of said first link of said second linkage assembly between said first and second ends of said second reciprocating member, and said second link of said second linkage assembly being pivotally connected at one end to the other end of said first link of said second linkage assembly and pivotally connected proximate the other end of said second link to said frame;

said second links of said first linkage assembly and said second linkage assembly having a handle portion proximate said other end so that the user of said apparatus may grip the handle portions during use of the apparatus enabling a substantially arcuate movement of said handle portions.

12. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means for orienting the bottom of each foot of the user of the apparatus, said orienting means including first and second foot platforms and corresponding first and second predetermined reference planes so that during operation of the apparatus each said foot platform follows a substantially elliptical path having upper and lower halves while said first predetermined reference plane remains substantially parallel with the floor as said first foot platform advances rearwardly through substantially the lower half of said elliptical path and said second predetermined reference plane remains substantially parallel with the floor as said second foot platform advances rearwardly through substantially the lower half of said elliptical path.

13. The exercising apparatus according to claim 12 wherein said coupler member attaching means comprises:

a first element attached at one end to said pulley proximate said pivot axis and at its other end to said second end of said first linkage assembly reciprocating member; and a second element attached at one end to said pulley proximate said pivot axis and at its other end to said second end of said second linkage assembly reciprocating member.

14. The exercising apparatus according to claim 12 wherein each reciprocating member includes means for enabling said first ends of said reciprocating members to contact said base portion.

15. The exercising apparatus according to claim 12 wherein each said reciprocating member includes means for enabling said first ends of said reciprocating members to contact the floor.

16. An exercising apparatus comprising:

a frame having a base portion adapted to be supported by a floor;

a first linkage assembly having:

(i) a reciprocating member, (ii) a foot member, and (iii) an arm member, said reciprocating member having a first end and a second end, said first end of said reciprocating member being adapted for linear movement substantially parallel with the floor;

a second linkage assembly having:

(i) a reciprocating member, (ii) a foot member, and (iii) an arm member, said second linkage assembly reciprocating member having a first end and a second end, said first end of said second linkage assembly reciprocating member being adapted for linear movement substantially parallel with the floor; and a coupling member having:

(i) a pulley supported by said frame defining a pivot axis; and (ii) means for attaching said second ends of said reciprocating members to said pulley so that rotation of said pulley results in the rotation of said second ends of said reciprocating members in a substantially circular path about said axis, said first linkage assembly foot member being pivotally connected proximal one end between said first and second ends of said first linkage assembly reciprocating member, and the other end of said first linkage assembly foot member being pivotally connected to one end of said first linkage assembly arm member, said first linkage assembly foot member including a foot platform proximate said one end, and said first linkage assembly arm member being pivotally connected to said frame distally from said one end of said first linkage assembly arm member, said first linkage assembly arm member having a handle portion distally from said pivotal connection to said first linkage assembly foot member;

said second linkage assembly foot member being pivotally connected proximal one end between said first and second ends of said second linkage assembly reciprocating member, and the other end of said second linkage assembly foot member being pivotally connected to one end of said second linkage assembly arm member, said second linkage assembly foot member including a foot platform proximate said one end, and said second linkage assembly arm member being pivotally connected to said frame distally from said one end of said second linkage assembly arm member, said second linkage arm member having a handle portion distally from said pivotal connection to said second linkage assembly foot member, wherein during operation of the apparatus each said foot platform follows a substantially elliptical path having upper and lower halves and forward and rearward ends while each said foot platform remains substantially parallel with the floor proximate said forward end through at least a portion of the lower half of said elliptical path.

17. The exercising apparatus according to claim 16 wherein each said foot platform remains substantially parallel with the floor through substantially the lower half of said elliptical path.

18. An exercising apparatus comprising:

a frame having a base portion adapted to be supported by a floor;

first and second reciprocating members, each reciprocating member having first and second ends, said first end of said first and second reciprocating members being adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in rotation of said second ends of said first and second reciprocating members in a substantially circular path about said axis;

first linkage assembly having a foot member and an arm member, said foot member of said first linkage assembly being pivotally connected between the first and second ends of said first reciprocating member proximate said first end of said first reciprocating member, said pivotal connection being proximal a first end of said foot member, and said foot member being pivotally connected at its other end to one end of said arm member, said arm member being pivotally connected to said frame proximal the other end of said arm member, said foot member including a foot platform proximate said first end of foot member; and second linkage assembly having a foot member and an arm member, said foot member of said second linkage assembly being pivotally connected between the first and second ends of said second reciprocating member proximate said first end of said second reciprocating member, said pivotal connection being proximal a first end of said foot member of said second linkage assembly, and said foot member of said second linkage assembly being pivotally connected at its other end to one end of said arm member of said second linkage assembly, said arm member of said second linkage assembly being pivotally connected to said frame proximal to the other end of said arm member of said second linkage assembly, said foot member of said second linkage assembly including a foot platform proximate said first and of said foot member of said second linkage assembly;

wherein during operation of the apparatus each said foot platform follows a substantially elliptical path having upper and lower halves and forward and rearward ends while each said foot platform remains substantially parallel with the floor as it progresses initially rearwardly proximate said forward end along at least a portion of the lower half of said elliptical path.

19. The exercising apparatus according to claim 18 wherein said coupler member attaching means comprises:

a first element attached at one end to said pulley proximate said pivot axis and at its other end to said second end of said first linkage assembly reciprocating member; and a second element attached at one end to said pulley proximate said pivot axis and at its other end to said second end of said second linkage assembly reciprocating member.

20. The exercising apparatus according to claim 18 wherein each reciprocating member includes means for enabling said first ends of said reciprocating members to contact said base portion.

21. The exercising apparatus according to claim 18 wherein each said reciprocating member includes means for enabling said first ends of said reciprocating members to contact the floor.

22. An exercising apparatus comprising:

a frame having a base portion adapted to be supported by a floor;

a first linkage assembly having a reciprocating member and a foot member, said reciprocating member having first and second ends, said first end of said reciprocating member being adapted for linear movement substantially parallel with the floor, said foot member having first and second ends and having a foot platform proximate said first end and defining a predetermined reference plane, said foot member being pivotally attached proximate said first end of said foot member between said first and second ends of said reciprocating member proximate said first end of said reciprocating member, said second end of said foot member adapted for linear movement substantially parallel with the floor;

a second linkage assembly having a reciprocating member and a foot member, said second linkage assembly reciprocating member having first and second ends, said first end of said second linkage assembly reciprocating member being adapted for linear movement substantially parallel with the floor, said second linkage assembly foot member having first and second ends and having a foot platform proximate said first end of said second linkage assembly foot member and defining a predetermined reference plane, said second linkage assembly foot member being pivotally attached proximate said first end of said second linkage assembly foot member between said first and second ends of said linkage assembly reciprocating member proximate said first end of said second linkage assembly reciprocating member, said second end of said second linkage assembly foot member being adapted for linear movement substantially parallel with the floor; and a coupling member having a pulley supported by said frame defining a pivot axis and means for attaching said second ends of said reciprocating members to said pulley so that rotation of said pulley results in the rotation of the second ends of said reciprocating members in a substantially circular path about said axis, wherein during operation of the apparatus each of said foot platforms follows a substantially elliptical path having upper and lower halves and forward and rearward ends while said first predetermined reference plane remains substantially parallel with the floor as said first foot platform advances initially rearwardly proximate said forward end along at least a portion of the lower half of said elliptical path and said second predetermined reference plane remains substantially parallel with the floor as said second foot platform advances initially rearwardly proximate said forward end along at least a portion of the lower half of said elliptical path.

23. The exercising apparatus according to claim 22 wherein said first and second reference planes remain substantially parallel with the floor as said corresponding first and second foot platforms advance rearwardly through substantially the lower half of said elliptical path.

24. The exercising apparatus according to claim 22 wherein said coupler member attaching means comprises:

a first element attached at one end to said pulley proximate said pivot axis and at its other end to said second end of said first linkage assembly reciprocating member; and a second element attached at one end to said pulley proximate said pivot axis and at its other end to said second end of said second linkage assembly reciprocating member.

25. The exercising apparatus according to claim 22 wherein said frame further comprises a top portion adapted to provide hand support for the user of the apparatus.

26. The exercising apparatus according to claim 22 wherein each reciprocating member includes means for enabling said first ends of said reciprocating members to contact said base portion.

27. The exercising apparatus according to claim 22 wherein each said reciprocating member includes means for enabling said second ends of said foot members to contact said base portion.

28. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means for orienting the bottom of each foot of the user of the apparatus, said orienting means including first and second foot platforms and corresponding first and second predetermined reference planes so that during operation of the apparatus each said foot platform follows a substantially elliptical path having upper and lower halves and forward and rearward ends while said first predetermined reference plane remains substantially parallel with the floor as said first foot platform advances initially rearwardly proximate said forward end along at least a portion of the lower half of said elliptical path and said second predetermined reference plane remains substantially parallel with the floor as said second foot platform advances initially rearwardly proximate said forward end along at least a portion of the lower half of said elliptical path.

29. The exercising apparatus according to claim 28 wherein said first and second reference planes remain substantially parallel with the floor as said corresponding first and second foot platforms advance rearwardly through substantially the lower half of said elliptical path.

30. The exercising apparatus according to claim 28 wherein said coupler member attaching means comprises:

a first element attached at one end to said pulley proximate said pivot axis and at its other end to said second end of said first linkage assembly reciprocating member; and a second element attached at one end to said pulley proximate said pivot axis and at its other end to said second end of said second linkage assembly reciprocating member.

* * * * *